United States Patent
Pichaimurthy et al.

(10) Patent No.: US 11,729,450 B2
(45) Date of Patent: *Aug. 15, 2023

(54) SYSTEMS AND METHODS FOR DELIVERY OF CONTENT VIA MULTICAST AND UNICAST

(71) Applicant: Rovi Guides, Inc., San Jose, CA (US)

(72) Inventors: Rajendran Pichaimurthy, Karnataka (IN); Madhusudhan Seetharam, Karnataka (IN); Harshith Kumar Gejjegondanahally Sreekanth, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,127

(22) Filed: Nov. 2, 2022

(65) Prior Publication Data

US 2023/0139636 A1 May 4, 2023

Related U.S. Application Data

(63) Continuation of application No. 17/313,355, filed on May 6, 2021, now Pat. No. 11,523,164, which is a
(Continued)

(51) Int. Cl.
| | |
|---|---|
| *H04N 21/266* | (2011.01) |
| *H04N 21/262* | (2011.01) |
| *H04N 21/2668* | (2011.01) |
| *H04N 21/81* | (2011.01) |
| *H04N 21/845* | (2011.01) |
| *H04N 21/6408* | (2011.01) |

(Continued)

(52) U.S. Cl.
CPC ..... *H04N 21/26616* (2013.01); *H04L 65/611* (2022.05); *H04L 65/612* (2022.05); *H04N 21/2668* (2013.01); *H04N 21/26208* (2013.01); *H04N 21/6408* (2013.01); *H04N 21/812* (2013.01); *H04N 21/8456* (2013.01); *H04L 67/306* (2013.01); *H04N 21/23424* (2013.01)

(58) Field of Classification Search
CPC ....... H04N 21/26616; H04N 21/26208; H04N 21/2668; H04N 21/6408; H04N 21/812; H04N 21/8456; H04N 21/23424; H04N 21/47217; H04N 21/6405; H04L 12/185; H04L 65/611; H04L 65/612; H04L 67/306

See application file for complete search history.

(56) References Cited

U.S. PATENT DOCUMENTS

| | | |
|---|---|---|
| 6,075,551 A | 6/2000 | Berezowski et al. |
| 6,239,794 B1 | 5/2001 | Yuen et al. |

(Continued)

*Primary Examiner* — Johnny B Aguiar
(74) *Attorney, Agent, or Firm* — Haley Guiliano LLP

(57) ABSTRACT

The system and methods described aid content delivery by providing requested content using a hybrid delivery of unicast and multicast content. A content delivery system receives, from user equipment, a request for content and identifies multicast sources for the content. The content delivery system determines a recent multicast source from the multicast sources, the recent multicast source having begun more recently relative to the other sources. The content delivery system transmits, to the user equipment, an identity of the recent multicast source and provides a beginning portion of the content to the user equipment via a unicast stream.

20 Claims, 11 Drawing Sheets

Related U.S. Application Data continuation of application No. 16/145,390, filed on Sep. 28, 2018, now Pat. No. 11,032,595.

(51) Int. Cl.
- H04L 65/611 (2022.01)
- H04L 65/612 (2022.01)
- *H04N 21/234* (2011.01)
- *H04L 67/306* (2022.01)

(56) References Cited

U.S. PATENT DOCUMENTS

| | | | |
|---|---|---|---|
| 6,564,378 B1 | 5/2003 | Satterfield et al. | |
| 7,761,892 B2 | 7/2010 | Ellis et al. | |
| 7,848,322 B2 | 12/2010 | Oved | |
| 8,219,134 B2 | 7/2012 | Maharajh et al. | |
| 8,897,256 B2 | 11/2014 | Cherian et al. | |
| 9,774,465 B2 | 9/2017 | Oyman et al. | |
| 10,063,934 B2 | 8/2018 | Guo et al. | |
| 11,523,164 B2 | 12/2022 | Pichaimurthy et al. | |
| 2006/0200574 A1* | 9/2006 | Pickens | H04N 21/26616 709/231 |
| 2009/0116481 A1* | 5/2009 | Ishii | H04N 21/47202 370/390 |
| 2009/0183198 A1 | 7/2009 | Ehlers et al. | |
| 2009/0300185 A1 | 12/2009 | Letellier et al. | |
| 2009/0328115 A1* | 12/2009 | Malik | H04N 21/2393 725/93 |
| 2010/0043022 A1* | 2/2010 | Kaftan | H04N 21/235 725/34 |
| 2010/0131995 A1* | 5/2010 | Guo | H04N 21/4325 725/94 |
| 2010/0169504 A1* | 7/2010 | Gabin | H04L 65/4076 709/231 |
| 2010/0228610 A1* | 9/2010 | Kaftan | G06Q 30/0241 705/14.4 |
| 2012/0317225 A1* | 12/2012 | Garg | H04N 21/2747 709/217 |
| 2013/0287048 A1* | 10/2013 | Begeja | H04N 21/26275 370/503 |
| 2014/0068662 A1 | 3/2014 | Kumar | |
| 2014/0095668 A1 | 4/2014 | Oyman | |
| 2014/0126887 A1* | 5/2014 | Harville | G11B 27/031 386/250 |
| 2014/0139742 A1* | 5/2014 | Krishna | H04N 21/812 348/565 |
| 2014/0362694 A1 | 12/2014 | Rodrigues | |
| 2015/0172747 A1 | 6/2015 | Huang et al. | |
| 2016/0373819 A1* | 12/2016 | Ramakrishnan | H04N 21/6408 |
| 2018/0199115 A1 | 7/2018 | Prasad | |
| 2021/0281902 A1 | 9/2021 | Pichaimurthy et al. | |

\* cited by examiner

610A

610B

SYSTEMS AND METHODS FOR DELIVERY OF CONTENT VIA MULTICAST AND UNICAST

CROSS-REFERENCE TO RELATED APPLICATIONS

This application is a continuation of U.S. patent application Ser. No. 17/313,355, filed May 6, 2021, which is a continuation of U.S. patent application Ser. No. 16/145,390 (now U.S. Pat. No. 11,032,595), filed Sep. 28, 2018, the disclosures of each of which are hereby incorporated by reference herein in their entireties.

BACKGROUND

The present disclosure is directed to content delivery systems and, more particularly, to a hybrid delivery using unicast and multicast to deliver content.

SUMMARY

Currently, users have access to content delivered via several mechanisms. Some content is delivered to users by unicast connections or streams. For example, content may be delivered by a one-to-one connection between a client device (e.g., user equipment) and a content source (e.g., a content server) across a network connection. Other content is delivered to many users at one time. For example, content may be delivered by multicast to several users across a network connection or by broadcast methods such as over-the-air (OTA) broadcast, satellite broadcast, or cable broadcast. For the purposes of this disclosure, multicast encompasses both multicast delivery across a network or the Internet and traditional broadcast delivery techniques (e.g., traditional cable delivery, satellite broadcasts, or terrestrial television broadcast). It will be apparent from the disclosure that the techniques described herein apply to many different manners of delivering the same content to multiple users.

In order to watch content from the beginning, a user may either begin watching multicast content when the content first starts or may receive the content on demand via a unicast stream. If the multicast delivery is already in progress, the user has to pick up the content at its present location, or the user can a unicast stream to pick up the content from the beginning. But, unicast streams require significantly more network utilization. Each user, whether on the same or different segments of the network, requires an individual and unique stream of data carrying the content being requested by the user. Multicast delivery, on the other hand, conserves network utilization by delivering a single version of content across many channels and segments of a network for delivery to several users at the same time.

Thus, a solution over conventional systems for providing a user with the beginning of the user's desired content without losing the benefits of multicast delivery is described herein. The systems and methods described herein achieves benefits over conventional systems by identifying a multicast version of the content that recently started, buffering the multicast delivery at the user equipment, providing a unicast stream from the beginning (or earlier point in time compared to the multicast delivery) of the requested content up to the beginning of the buffered multicast content, and then switching from the unicast stream to the buffered multicast content. This solution, detailed in the embodiments below, improves the network utilization by harnessing the benefits of multicast delivery and still providing users with individualized experiences—including starting content on demand.

Systems and methods are described herein for intelligently delivering content via a combination of multicast and unicast. A content delivery system is described that receives a request for content (e.g., a media asset) from a user equipment. As described more fully below, the user equipment may be a smartphone, a tablet, a personal computer, set-top box, or other appropriate device capable of receiving both a unicast stream and a multicast delivery. The content delivery system identifies available multicast versions of the requested content. For example, the content delivery system may obtain a content identifier from the request and consult a program guide, content listing, schedule information, or other appropriate data source to determine a list of multicast versions available for that content. In some embodiments, the content delivery system identifies the version of the multicast delivery that began more recently than the others; for example, the content delivery system may compare the start times of each multicast version and select the most recent start time.

Upon determining a multicast version available to the user equipment, the content delivery system may inform the user equipment of the existence of the multicast version by, for example, transmitting a message to the user equipment with a unique identifier for the multicast version. Using this information, the user equipment may begin buffering the multicast content at the current time. In parallel with the user equipment buffering the multicast content, the content delivery system also causes a unicast stream to be started to provide the user equipment with the requested content starting from the beginning of the content (or other moment in the content prior to the present location of the buffered multicast content). For example, content distribution protocols such as MPEG-DASH or HTTP Live Streaming may be used to create a unicast delivery of content.

At the appropriate time, e.g., when the unicast stream reaches the time point in the content corresponding with the beginning of the buffered multicast content, the user equipment may switch from accessing the unicast stream to accessing the buffered multicast content. Because the user equipment is accessing content in the buffered multicast content sent before the current point in the multicast content, the user equipment continues buffering new data from the multicast content and retrieves the buffered multicast content for output to the user. In some embodiments, the user equipment generates the content for output to the user and accesses the unicast stream to generate the content and then accesses the buffered multicast content to continue generating the content. In some embodiments, the user equipment captures the content for later output and utilizes the unicast stream and multicast content to store a single coherent copy of the content from the two sources.

Several techniques are described below for tracking how long the unicast stream is required before terminating the unicast stream. A server in the content delivery system may record a time mark for the time in the content when buffering started and determine when the unicast stream reaches that time mark. Alternatively, a server in the content delivery system may record a time mark based on the difference between the current real time and when the multicast content began; i.e., how much time is required for a unicast stream to catch up to the current point in the multicast content. The user equipment may be responsible for tracking the time points when the user equipment began buffering the multicast content and when the unicast stream reaches the same time point. Alternatively, or additionally, the content delivery system may perform content analysis, e.g., audio or video recognition, to determine when a unicast stream reaches the same content as the beginning of the buffered multicast content, and the server may send an instruction to a client device, e.g., user equipment, that indicates the unicast stream is no longer needed and the client device should switch to the buffered multicast content when the server determines the unicast stream has reached the beginning of the buffered multicast content.

The techniques described herein afford additional opportunities to customize content received in the unicast stream. In some embodiments of the disclosure, portions of the unicast stream are shortened or eliminated to reduce the amount of time the unicast stream remains ongoing. For example, if the unicast stream contains advertisement portions, the content delivery system may prioritize ending the unicast stream over displaying advertisements and, therefore, the content delivery system may remove the advertisements from the unicast stream or shorten the advertisements. Removal of this content from the unicast stream means the unicast stream will, effectively, catch up to the beginning of the buffered multicast content more quickly. In some embodiments, the content delivery system may replace advertisements in the unicast stream with overlay text during output of the requested content so that the advertising message is output to the user without requiring dedicated advertising periods. Furthermore, because the unicast stream is specific to the user, the content delivery system may analyze a user's profile to determine content specific to the user for inclusion in the unicast portion of the media. For example, the content delivery system may select targeted advertisements for inclusion in the unicast stream.

In some embodiments, the content delivery system may determine that a multicast version of the content is starting within a threshold amount of time or that the already-started multicast versions began before another threshold amount of time. Thus, the content delivery system may determine that a unicast version of the requested content should not be used for the requested content. In that scenario, the content delivery system may instead provide the user with supplemental content while the user awaits the imminent start of the next multicast version of the content. As described below, this supplemental content may be selected based on the user's profile, the requested content, and/or other criteria within the content delivery system. In some embodiments, the content delivery system may utilize this time window to provide targeted advertisements to the user equipment.

It should be noted that the methods and systems described herein for one embodiment may be combined with other embodiments as discussed herein. It should be emphasized that the term "comprises/comprising" when used in this specification specifies the presence of stated features, steps or components, but does not preclude other features, steps, components or groups thereof.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
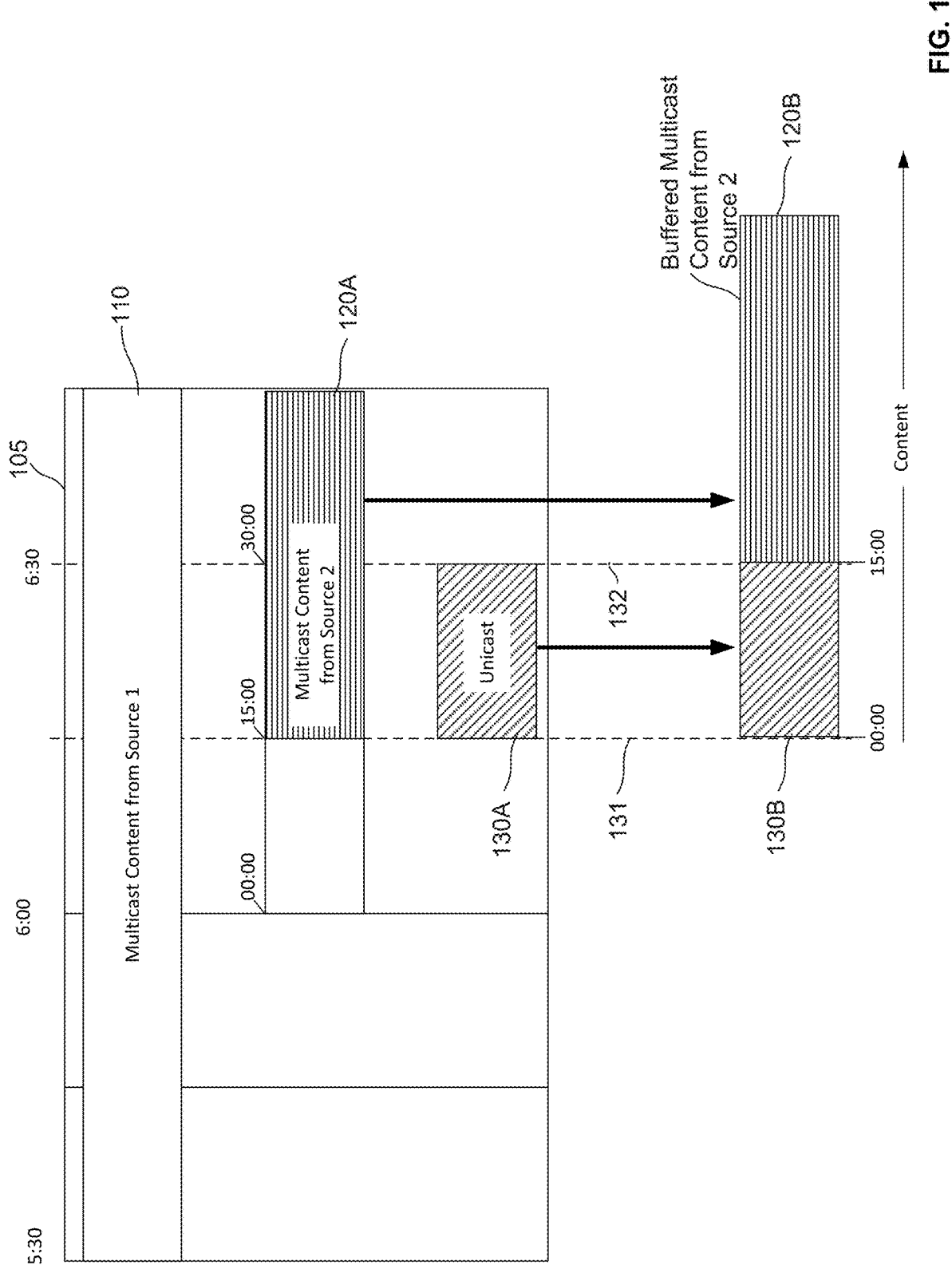
FIG. 1 shows an illustrative example of hybrid delivery of unicast and multicast content, in accordance with some embodiments of the disclosure.

FIG. 1 shows an illustrative example of hybrid delivery of unicast and multicast content, in accordance with some embodiments of the disclosure. FIG. 1 depicts a timeline of content sources 105 from times between 5:30 and 7:00. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices but can also be part of a live performance. The timeline 105 depicts multiple sources for the same content, which may start at different time points. For example, one piece of content may be a recent movie such as "Incredibles 2." The content, e.g., "Incredibles 2," may be available from two multicasts sources, multicast source 1 and multicast source 2.

By way of example, FIG. 1 depicts that multicast source 1 started delivering multicast content 110 at 5:30 while multicast source 2 started delivering multicast content 120A at 6:00. As discussed above, multicast source 1 and multicast source 2 may deliver content to multiple users using appropriate technology such as multicast streaming over the Internet, cellular broadcast, over-the-air (OTA) broadcast, cable broadcast, or other single stream to multiple user delivery systems. Moreover, each multicast source may be delivered using a differing multicast technology. For example, multicast source 1 may deliver content by way of OTA broadcast while multicast source 2 may delivery content by way of multicast streaming over the Internet.

The timeline 105 also depicts a unicast stream 130A of the content starting at time point 131, e.g., 6:15. In accordance with the techniques described below, the content may be delivered to user equipment for output to the user in a manner that allows the user equipment to output the beginning of the content using the unicast stream 131 from 6:15-6:30 while buffering multicast content 120A starting at the 15-minute mark of the content using multicast source 2. The user equipment may then, at the 15-minute mark of the content, e.g., time point 132 (6:30), switch from output of the unicast stream to a buffered copy of multicast content 120B received from multicast source 2. Using this technique, a content delivery system may realize the bandwidth savings provided by multicast delivery along with the user experience enhancement of on-demand content delivery. The combined delivery of content is depicted in the bottom of FIG. 1, which shows the unicast content 130B from timepoints 131 to 132 corresponding with 0:00-15:00 of the content followed by buffered multicast content 120B from multicast source 2 corresponding with 15:00-45:00 of the content. The content from multicast source 2 may be buffered until the end of the content is reached. The user equipment may then access the buffered multicast content 120B up to the end of content, after switching from unicast stream 130B to multicast content 120B, to continue playback of the content to the end.

Figure 2:
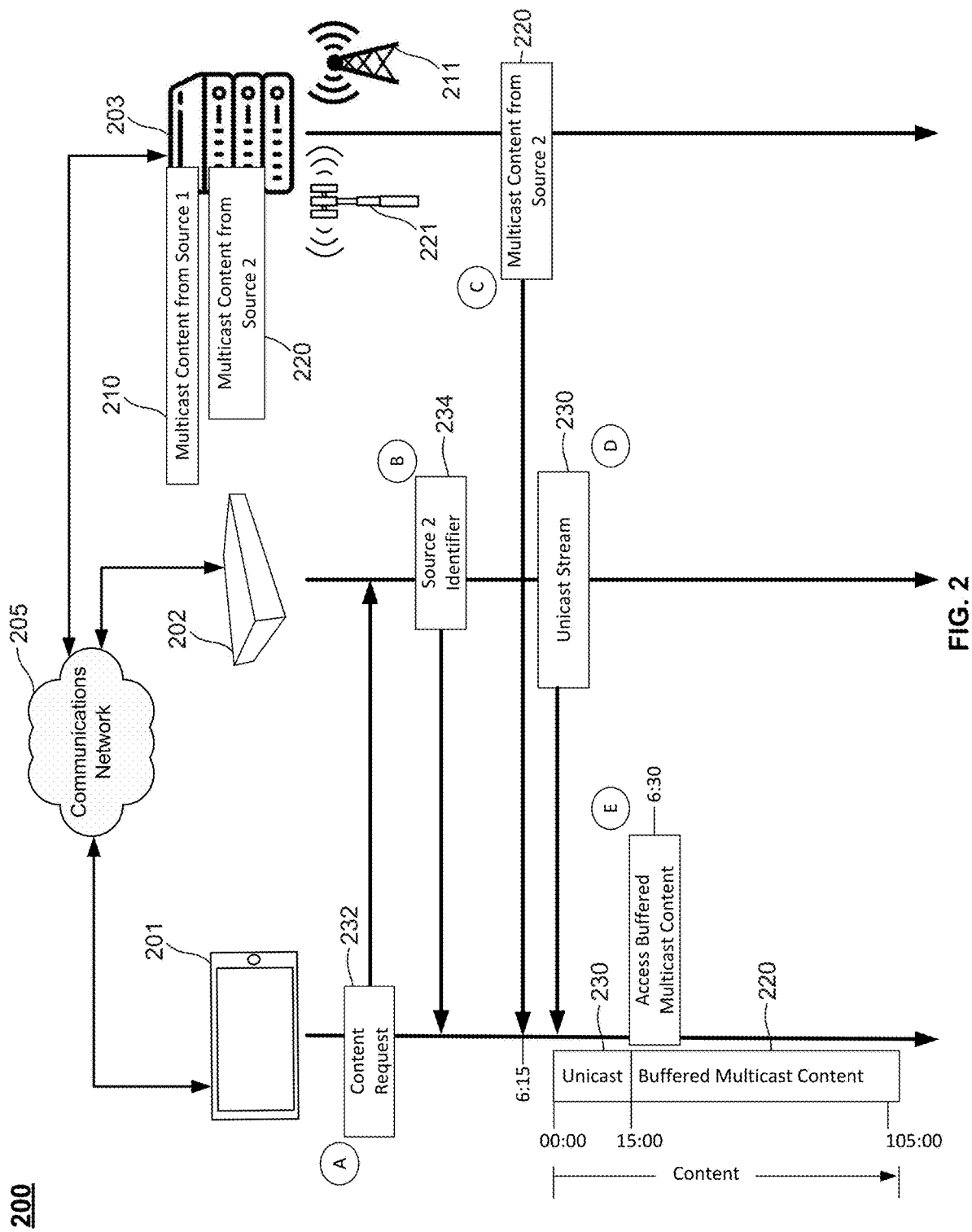
FIG. 2 shows a block diagram of an illustrative process flow for delivery of content via multicast and unicast.

FIG. 2 shows a block diagram of an illustrative process flow for delivery of content via multicast and unicast. FIG. 2 depicts communications in a content delivery system 200, which includes user equipment 201, content server 202 and multicast sources 203. As described below with reference to FIG. 3, the devices 201, 202, and 203 may include components, circuitry, and instructions designed to implement the methods and systems described herein. For example, user equipment 201 may be implemented using hardware described with reference to user equipment 300 or with reference to user equipment system 301.

A user equipment device 201 utilizing at least some of the system features described above in connection with FIG. 3 may, like some computer equipment, be Internet-enabled allowing access to Internet content, while other user equipment may, like some television equipment, include a tuner, allowing access to television programming. An application providing the techniques described herein may have the same layout on various different types of user equipment or may be tailored to the display capabilities of the user equipment. For example, on user equipment accessing Internet content, a content access application may be provided as a website accessed by a web browser. In another example, the content access application may be scaled down for wireless user communications devices.

In content delivery system 200, there is typically more than one user equipment device 201, content server 202, and multicasts sources 203 but only one of each is shown in FIG. 2 to avoid overcomplicating the drawing. In addition, each user may utilize more than one type of user equipment device and also more than one of each type of user equipment device.

Devices 201, 202, and 203 of FIG. 2 may be in communication through a communications network 205. Communications network 205 may be one or more networks including the Internet, a mobile phone network, mobile voice or data network (e.g., a 4G or LTE network), cable network, public switched telephone network, or other types of communications network or combinations of communications networks. Communication paths may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the user equipment devices may be provided by one or more of these communications paths but are shown as a single path in FIG. 2 to avoid overcomplicating the drawing.

User equipment devices may communicate directly with each other via communication paths, such as those described above, as well as other short-range point-to-point communication paths, such as USB cables, IEEE 1394 cables, wireless paths (e.g., Bluetooth, infrared, IEEE 802.11x, etc.), or other short-range communication via wired or wireless paths. BLUETOOTH is a certification mark owned by Bluetooth SIG, INC. The user equipment devices may also communicate with each other through an indirect path via communications network 205.

The content delivery system 200 comprises content sources such as content server 202 and multicast sources 203. The content delivery system also includes media guidance data sources, which may include content server 202 and multicast sources 203 or may comprise additional servers not depicted in FIG. 2, for providing metadata. Communications with the content sources and media guidance data sources may be exchanged over one or more communications paths via, for example, communications network 205. In addition, there may be more than one of each of content source and media guidance data source. If desired, a content source and a media guidance data source may be integrated as one source. Although communications between sources and user equipment devices are shown as being through communications network 205, in some embodiments, sources may communicate directly with user equipment devices via communication paths (not shown) such as the short-range point-to-point communication paths described above.

A content source, e.g., content server 202 and multicast sources 203, may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. The content source may be the originator of content (e.g., a television broadcaster, a Webcast provider, etc.) or may not be the originator of content (e.g., an on-demand content provider, an Internet provider of content of broadcast programs for downloading, etc.). A content source may include cable sources, satellite providers, on-demand providers, Internet providers, over-the-top content providers, or other providers of content. A content source may also include a remote media server used to store different types of content (including video content selected by a user), in a location remote from any of the user equipment devices. Systems and methods for remote storage of content and providing remotely stored content to user equipment are discussed in greater detail in connection with Ellis et al., U.S. Pat. No. 7,761,892, issued Jul. 20, 3010, which is hereby incorporated by reference herein in its entirety.

A media guidance data source (e.g., content server 202 or multicast sources 203) may provide media guidance data, such as the media guidance data described above. Media guidance data may be provided to the user equipment devices using any suitable approach. In some embodiments, the content access application may include a stand-alone interactive television program guide (e.g., a media guidance application) that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data sources may be provided to users' equipment using a client-server approach. For example, a user equipment device may pull media guidance data from a server, or a server may push media guidance data to a user equipment device. In some embodiments, a content delivery application client residing on the user's equipment may initiate sessions with sources to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). A media guidance data source may provide to user equipment devices (e.g., user equipment 201) the application itself or software updates for the application.

In some embodiments, multicast sources 203 are delivering content to multiple destination devices. For example, a multicast source 1 for a piece of content, e.g., a recent movie, may utilize OTA broadcast techniques using OTA broadcast hardware 211 (e.g., terrestrial television transmission antennas and attendant hardware). A multicast source 2 for the same content may utilize cellular broadcast hardware 221 (e.g., Long-Term Evolution (LTE) transmission antennas and attendant hardware) to deliver the content, albeit the content having started at a different time (e.g., 5:30 versus 6:00). In some embodiments, one or more of the multicast sources 203 may delivery content by network-based communication to destination devices (e.g., using Internet-based multicasting).

Content and/or media guidance data delivered to user equipment devices may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute applications (e.g., web-based applications or cloud-based applications), or the content can be displayed by applications stored on the user equipment device.

Figure 4A:
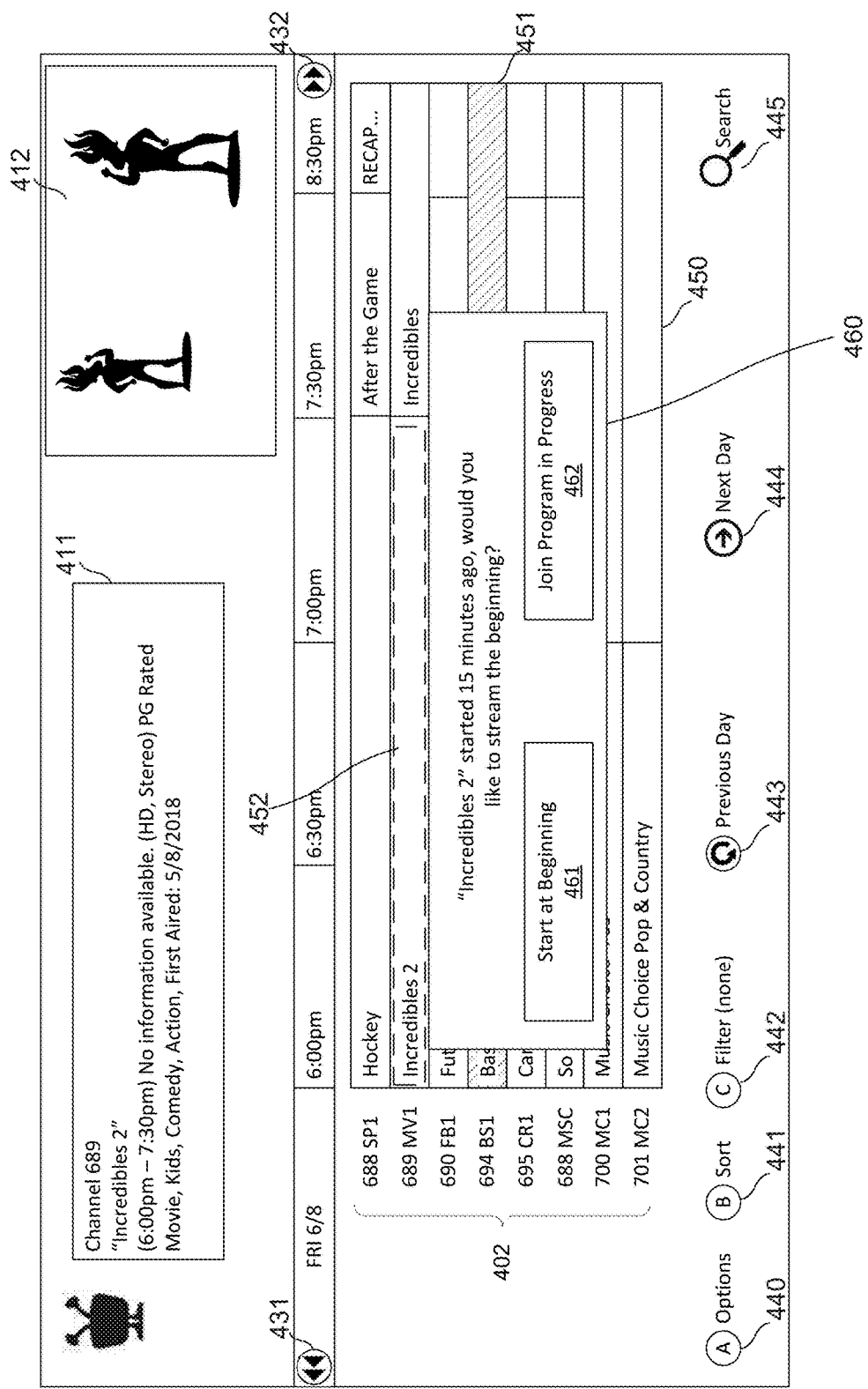
FIG. 4A shows an illustrative embodiment of a display screen that may be used to provide media guidance application listings and other media guidance information, in accordance with some embodiments of the disclosure.

At point A of FIG. 2, user equipment 201 transmits a content request 232 to a content source (e.g., content server 202). For example, the user equipment may receive a selection from a user to access a piece of content; e.g., a selection of a movie for output on the user equipment. For example, a user may be operating user equipment 201 via a content access application such as depicted in FIG. 4A and described below. The user may select an option to watch content (e.g., a movie such as "Incredibles 2") from the content access application. The user equipment may generate a request that includes information identifying the desired content and transmit the generated request 232 to the content server 202. In some embodiments, the user equipment may contact a web service using JavaScript Object Notation (JSON) formatted requests or access a remote data source (such as content server 202 or another media guidance data source). In some embodiments, the user equipment 201 formats the request to indicate a timepoint in the content at which the user equipment is requesting to start receiving the content. For example, if the user equipment received an instruction to output the content starting at five minutes into the content, then the request may identify the five-minute mark as the starting point of the content.

In response to receiving the content request 232 from user equipment 201, the content server 202 may analyze the content request 232 to determine how to instruct the user equipment to access the desired content. For example, the content server 202 may analyze the content request 232 and access a media guidance data source (e.g., content server 202 or multicast servers 203) to determine which sources exist for the desired content. The content server 202 may determine that multiple multicast sources are available for the content, e.g., multicast source 1 and multicast source 2. For example, the content server may retrieve a data structure identifying multicast and unicast sources. In some embodiments, the content server 202 may further include a database of media guidance data that identifies content sources, and the content server 202 is able to query this database without making a remote query to an external source.

The content server 202 may determine in which of the multicast sources 203 the content at the requested timepoint appeared most recently. For example, if the content request 232 indicates a start time in the content of 00:00 (i.e., the beginning of content) then the content server 202 may identify the most recently started multicast source. On the other hand, if the content request 232 indicates that the desired start point of the content is 25:00 into the content, then a multicast source of the content that started 30 minutes ago is only 5 minutes ahead of the desired content, while a multicast source that started 15 minutes ago is still 10 minutes behind the desired time point. Thus, the content server 202 may identify the multicast source that started 30 minutes ago in the second scenario.

At point B, content server 202 transmits an identifier 234 for the identified multicast source, e.g., multicast source 2, to the user equipment 201. In some embodiments, the content server 202 transmits a JSON response to the user equipment 201. In some embodiments, the content server 202 returns a data object in response to a remote procedure call (RPC). In some embodiments, the content server 202 may transmit the identifier in accordance with other appropriate data messaging systems. In some embodiments, the content server 202 may transmit additional information to user equipment 201 providing information for how the user equipment may access the requested content. For example, the content server 202 may send information to the user equipment 201 that includes multicast 2 identifier 234. In some embodiments, the information may further include information instructing the user equipment 201 to access the beginning of the requested content via a unicast stream. Still further access information may include information that indicates when multicast source 2 began delivering the requested content.

In response to the user equipment 201 receiving information from content server 202 that informs the user equipment 201 how to access the requested content, the user equipment may begin the process of accessing the desired content. For example, if the multicast 2 identifier 234 indicates that the multicast source 2 is an OTA broadcast, then the user equipment 201 may activate a tuner and configure the tuner to receive a broadcast channel. In another example, if the multicast 2 identifier 234 indicates that the multicast source 2 is a multicast stream via the Internet, then the user equipment 201 may join the multicast stream using, for example, IGMP techniques. Thus, at point C, the user equipment 201 begins receiving the multicast content 220 from multicast source 2. When the user equipment 201 receives the multicast content 220 from multicast source 2, the multicast content 220 may have started at a past time, e.g., 15 minutes prior to transmission of the content request 232. To facilitate later output of the multicast content 220, the user equipment begins buffering the multicast content 220 from multicast source 2. For example, the user equipment 201 may store the content in storage (such as storage 308, as described later). In some embodiments, the user equipment 201 may cause a remote device (such as remote server 202) to receive and buffer the multicast content 220 rather than buffering the multicast content itself.

At point D, the user equipment 201 begins receiving a unicast stream 230 of the requested content from a point in the content prior to the point in the content when the user equipment began buffering the multicast content 220. For example, the user equipment begins receiving a unicast stream from the content source 202 that starts from the beginning of the content, using the example of the user equipment 201 requesting the beginning of the content. The content delivery system may determine that multicast source 2 started more recently than other multicast sources but that source started fifteen minutes ago, and the content is at the 15-minute mark. Thus, the content delivery system may determine the user equipment 201 can access the content from the 0-minute mark by first retrieving a unicast stream 230 (which is started at the 0-minute mark of the content). In this example, the user equipment 201 continues accessing the unicast stream 230 for 15 minutes, at which point the content of the unicast stream would reach the content point that starts the buffered multicast content. At that point, the user equipment 201 can begin accessing the buffered multicast content 220.

At point E, the user equipment 201 begins accessing the buffered multicast content 220. As described more fully below, the user equipment 201 may switch from the unicast stream 230 to accessing the buffered multicast content 220 upon a determination that the content in the unicast stream has reached the point in the content at which the user equipment began buffering the multicast content 220. In this way, the content delivery system provides techniques that allow for on-demand access of content and obtain the network utilization efficiencies provided by multicast content delivery.

The instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

Applications may be, for example, stand-alone applications implemented on user equipment devices or content sources. For example, the content delivery application or content access application may be implemented as software or a set of executable instructions, which may be stored in storage 308 and executed by control circuitry 304 of user equipment device 300 and user equipment system 301. In some embodiments, applications may be client-server applications where only a client application resides on the user equipment device, and a server application resides on a remote server. For example, applications may be implemented partially as a client application on control circuitry 304 of each one of user equipment device 300 and user equipment system 301 and partially on a remote server as a server application (e.g., content server 202) running on control circuitry of the remote server. When executed by control circuitry of the remote server (such as content server 202), the content delivery application may instruct the control circuitry to generate the content delivery application displays and transmit the generated displays to the user equipment devices. The server application may instruct the control circuitry of the content source to transmit data for storage on the user equipment. The client application may instruct control circuitry of the receiving user equipment to generate the content delivery application displays.

Figure 3:
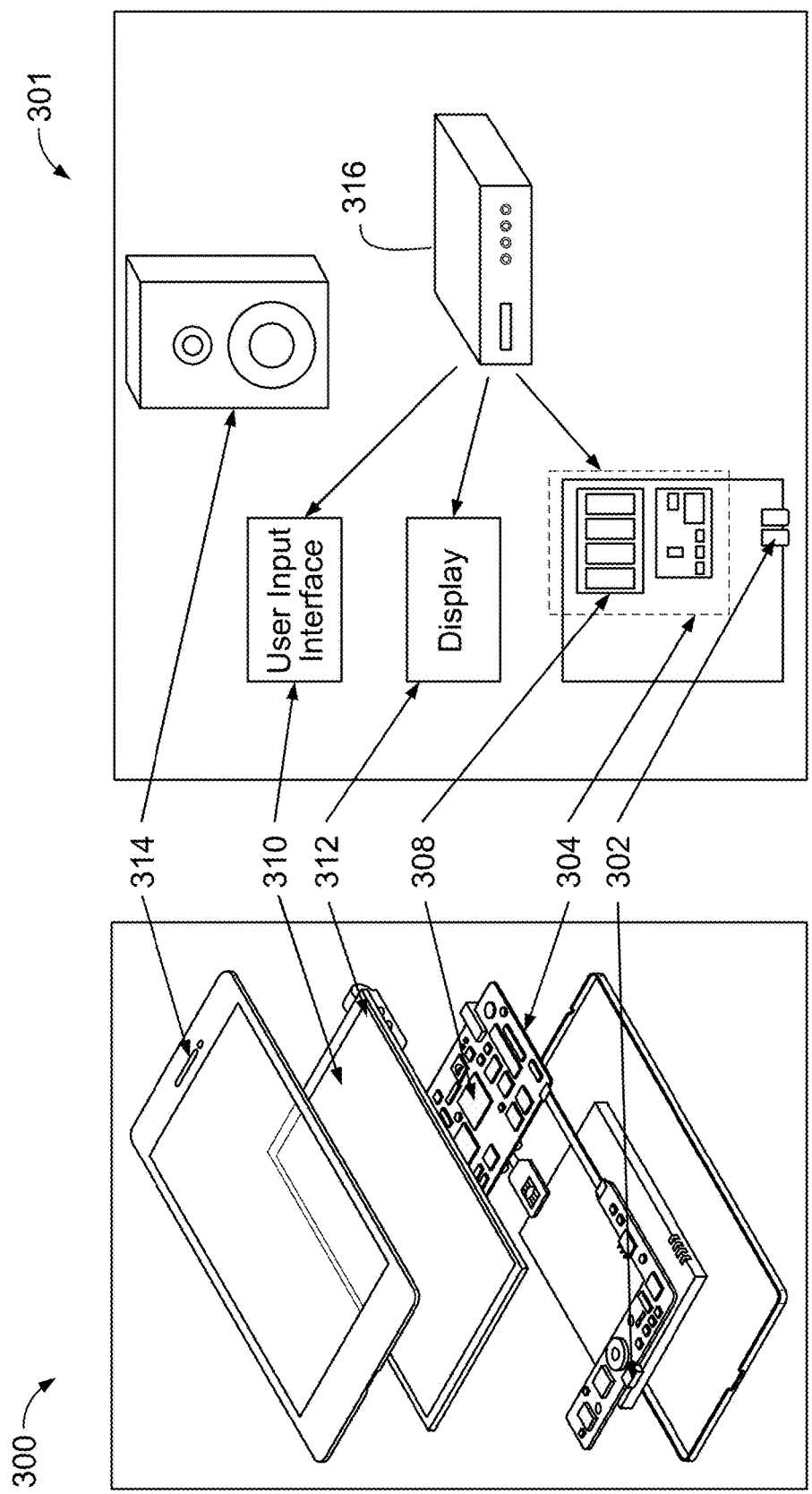
FIG. 3 is a block diagram of an illustrative user equipment, in accordance with some embodiments of the disclosure.

Users may access content and the applications from one or more of their media devices, i.e., user equipment. FIG. 3 shows generalized embodiments of an illustrative device, i.e., user equipment 201. For example, user equipment 201 may be a smartphone device, a tablet, or a remote control, such as illustrative user equipment 300. In another example, user equipment 201 may be a user equipment system 301. User equipment system 301 may include a set-top box 316. Set-top box 316 may be communicatively connected to speaker 314 and display 312. In some embodiments, display 312 may be a television display or a computer display. In some embodiments, set-top box 316 may be communicatively connected to user interface input 310. In some embodiments, user interface input 310 may be a remote control device. Set-top box 316 may include one or more circuit boards. In some embodiments, the circuit boards may include control circuitry and storage (e.g., RAM, ROM, Hard Disk, Removable Disk, etc.). In some embodiments, circuit boards may include an input/output path. More specific implementations of user equipment devices are discussed below in connection with FIG. 4. Each one of user equipment device 300 and user equipment system 301 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304 and storage 308. Control circuitry 304 may be used to send and receive commands, requests, and other suitable data using I/O path 302. I/O path 302 may connect control circuitry 304 to one or more communications paths (described below). I/O functions may be provided by one or more of these communications paths but are shown as a single path in FIG. 3 to avoid overcomplicating the drawing.

Control circuitry 304 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an application stored in memory (e.g., storage 308). Specifically, control circuitry 304 may be instructed by the application to perform the functions discussed above and below. For example, the application may provide instructions to control circuitry 304 to generate the media guidance displays. In some implementations, any action performed by control circuitry 304 may be based on instructions received from the application.

In client server-based embodiments, control circuitry 304 may include communications circuitry suitable for communicating with a content delivery application server or other networks or servers. The instructions for carrying out the above-mentioned functionality may be stored on the content delivery application server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, non-transitory computer-readable medium, or any other suitable fixed or removable storage devices, and/or any combination of the same. Storage 308 may be used to store various types of content, media guidance data, and instructions for executing content access applications. Nonvolatile memory may also be used (e.g., to launch a boot-up routine and other instructions).

Control circuitry 304 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, play, or record content. The tuning and encoding circuitry may also be used to receive guidance data. The circuitry described herein, including, for example, the tuning, video-generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch-and-record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touchscreen, touchpad, stylus input, joystick, voice recognition interface, or other user input interfaces. Display 312 may be provided as a stand-alone device or integrated with other elements of each one of user equipment device 300 and user equipment system 301. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be integrated with the control circuitry 304. Speakers 314 may be provided as integrated with other elements of each one of user equipment device 300 and user equipment system 301 or may be stand-alone units. The audio component of videos and other content displayed on display 312 may be played through speakers 314. In some embodiments, the audio may be distributed to a receiver (not shown), which processes and outputs the audio via speakers 314.

The content delivery application and/or content access application may be implemented using any suitable architecture. For example, those applications may be stand-alone applications wholly implemented on each one of user equipment device 300 and user equipment system 301. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions for the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the applications are client server-based application. Data for use by a thick or thin client implemented on each one of user equipment device 300 and user equipment system 301 is retrieved on-demand by issuing requests to a server remote to each one of user equipment device 300 and user equipment system 301. In one example of a client server-based content delivery application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the applications are downloaded and interpreted or otherwise run by an interpreter or virtual machine (run by control circuitry 304). In some embodiments, the applications may be encoded in the ETV Binary Interchange Format (EBIF), received by control circuitry 304 as part of a suitable feed, and interpreted by a user agent running on control circuitry 304. For example, the applications may be an EBIF application. In some embodiments, the content delivery application may be defined by a series of JAVA-based files that are received and run by a local virtual machine or other suitable middleware executed by control circuitry 304. In some of such embodiments (e.g., those employing MPEG-2 or other digital media encoding schemes), the applications may be, for example, encoded and transmitted in an MPEG-2 object carousel with the MPEG audio and video packets of a program.

Content sources (e.g., content server 202 and content sources 203) and media guidance sources comprise elements similar to those found in user equipment 300 and user equipment system 301. For example, content sources and media guidance sources include control circuitry, storage, and IO paths as described above. In some embodiments, content sources and media guidance sources further include user input interface 310, speaker 314, and/or display 312. These components operate in a manner similar to the descriptions provided with reference to user equipment 300 and user equipment system 301.

FIG. 4A is an illustrative embodiment of a display screen that may be used by a content delivery application or content access application (including a media guidance application) to provide listings and other media guidance information, in accordance with some embodiments of the disclosure. FIG. 4 shows an illustrative grid of a program listings display 400 arranged by time and channel that also enables access to different types of content in a single display. Display 400 may include grid 450 with (1) a column of channel/content type identifiers 402 where each channel/content type identifier (which is a cell in the column) identifies a different channel or content type available; and (2) a row of time identifiers (displayed above program listings), where each time identifier (which is a cell in the row) identifies a time block of programming. Grid 450 also includes cells of program listings, such as program listing 451 (highlighted to indicate the user equipment is currently receiving the content selected at 451), where each listing provides the title of the program provided on the listing's associated channel and time. With a user input device, a user can select program listings by moving highlight region 452. Information relating to the program listing selected by highlight region 452 may be provided in program information region 411. Region 411 may include, for example, the program title, the program description, the time the program is provided (if applicable), the channel the program is on (if applicable), the program's rating, and other desired information. With a user input device, a user can also select grid forward option 432 or grid back option 431, which shift the displayed program times for content selection. The display 400 may also provide several elements such as options element 440 which raises a submenu to customize display 400 options, sort element 441 which allows a user to customize the sorting of channels (e.g., sort by channel number or genre type), filter option 442 (e.g., allowing a user to filter listing by genre), previous day element 443 (e.g., shifting the grid 450 by 24 hours into the past), next day element 444 (e.g., shifting the grid by 24 hours into the future), and search element 445 (e.g., raising a search interface).

In addition to providing access to linear programming (e.g., content that is scheduled to be delivered by multicast delivery to user equipment devices at a predetermined time and is provided according to a schedule), the media guidance application also provides access to non-linear programming (e.g., content accessible to a user equipment device at any time and not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on demand as streaming content or downloadable content through an Internet web site or other Internet access (e.g., FTP).

Display 400 may also include video region 412. Video region 412 may allow the user to view and/or preview programs that are currently available, will be available, or were available to the user. The content of video region 412 may correspond to, or be independent from, one of the listings displayed in grid 450. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other content access application display screens of the embodiments described herein.

Upon receiving a selection to change to content selected by region 452, a content delivery application may invoke process 900 (FIG. 9) to access the selected content. The display 400 may determine the content is live content (e.g., step 908 of FIG. 9) and provide a prompt 460 asking whether to display the content from the beginning of the show (e.g., step 916 of FIG. 9). The prompt may include an option 461 to display the content from the beginning of the show and an option 462 to display the content at its current point. As described below in FIG. 10, the content delivery application may invoke a buffered content access if a user selected option 461 to watch the program from the beginning. If the user selects option 462, the content delivery application may receive and output the multicast content in progress as described at step 920 and 914 of FIG. 9.

Figure 4B:
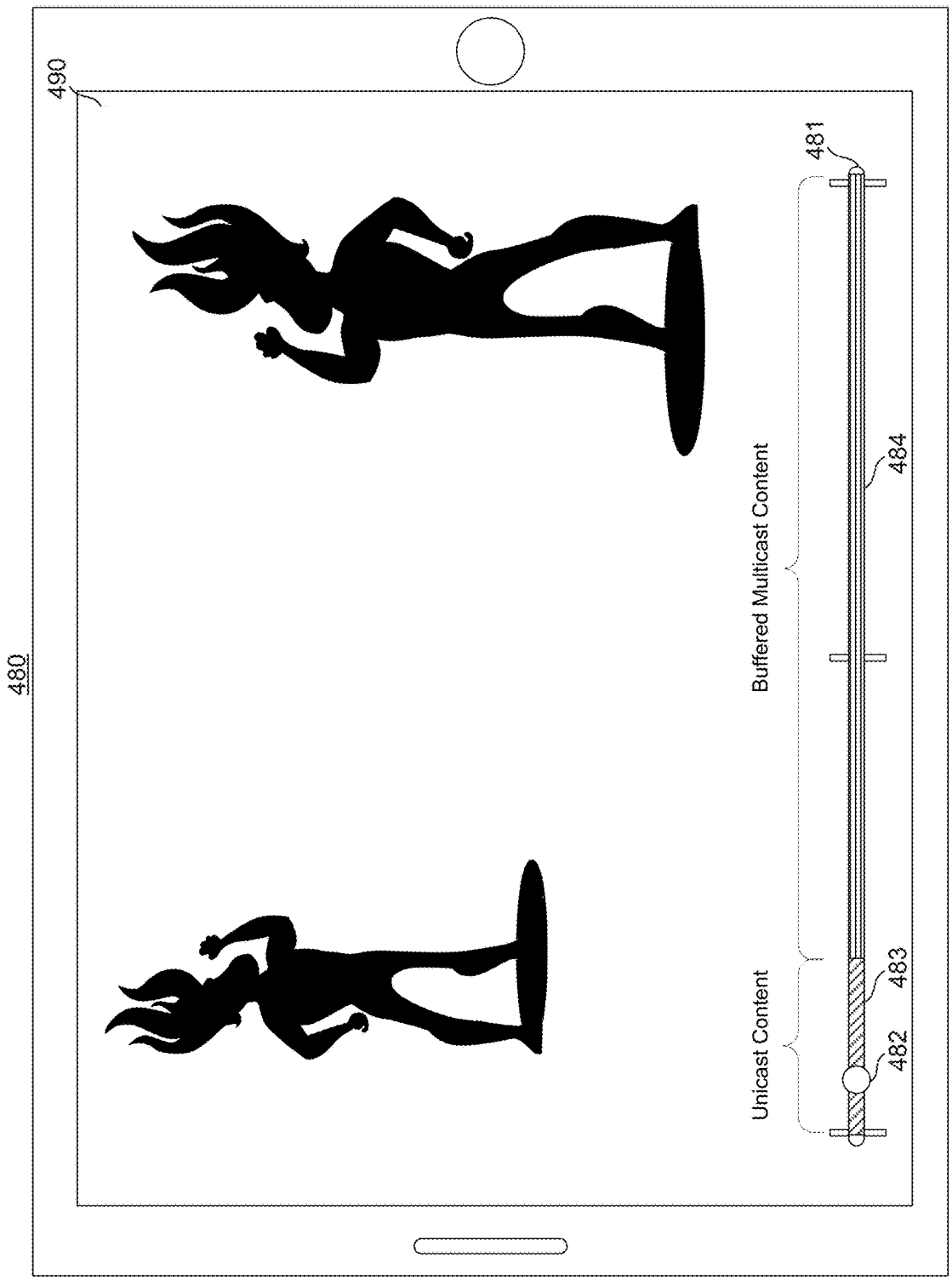
FIG. 4B depicts an illustrative embodiment of a display screen that may be used to provide control during display of content provided by hybrid delivery of unicast and multicast content, in accordance with some embodiments of the disclosure.

FIG. 4B depicts an illustrative embodiment of a display screen that may be used to provide control during display of content provided by hybrid delivery of unicast and multicast content, in accordance with some embodiments of the disclosure. Display 480 may be provided by user equipment (e.g., user equipment 201) during output of content 490 selected in display 400 (e.g., "Incredibles 2" as selected by highlight region 452). More particularly, display 480 includes a trickplay bar 481 that includes a content position indicator 482. Display 480 may include time marker annotations (e.g., every 30 minutes) such as a vertical bar on the trickplay bar 481. In some embodiments, the time marker annotations include corresponding text denoting the timepoints.

During output of the content, the content position indicator 482 moves along content bar 481 to indicate the current position of the content relative to the accessible portions of the content. Furthermore, user equipment 201 provides access (via, e.g., user input interface 310) to the content position indicator 482 to allow a user to move the playback position within the accessible content.

Display 480 shows two sections of content in trickplay bar 481. The first section of content is shown as unicast content 483. Using the example of FIG. 1, unicast content 483 may be the first 15:00 minutes of content (e.g., unicast content 130B) of selected content (e.g., a movie such as "Incredibles 2"). The second portion of trickplay bar 481 is buffered multicast content 484 (e.g., buffered multicast content 120B). Display 480 may display each portion of the content with the different visual styling to denote the portions of the content received from a unicast stream and the portions of content received from a multicast delivery.

Figure 5:
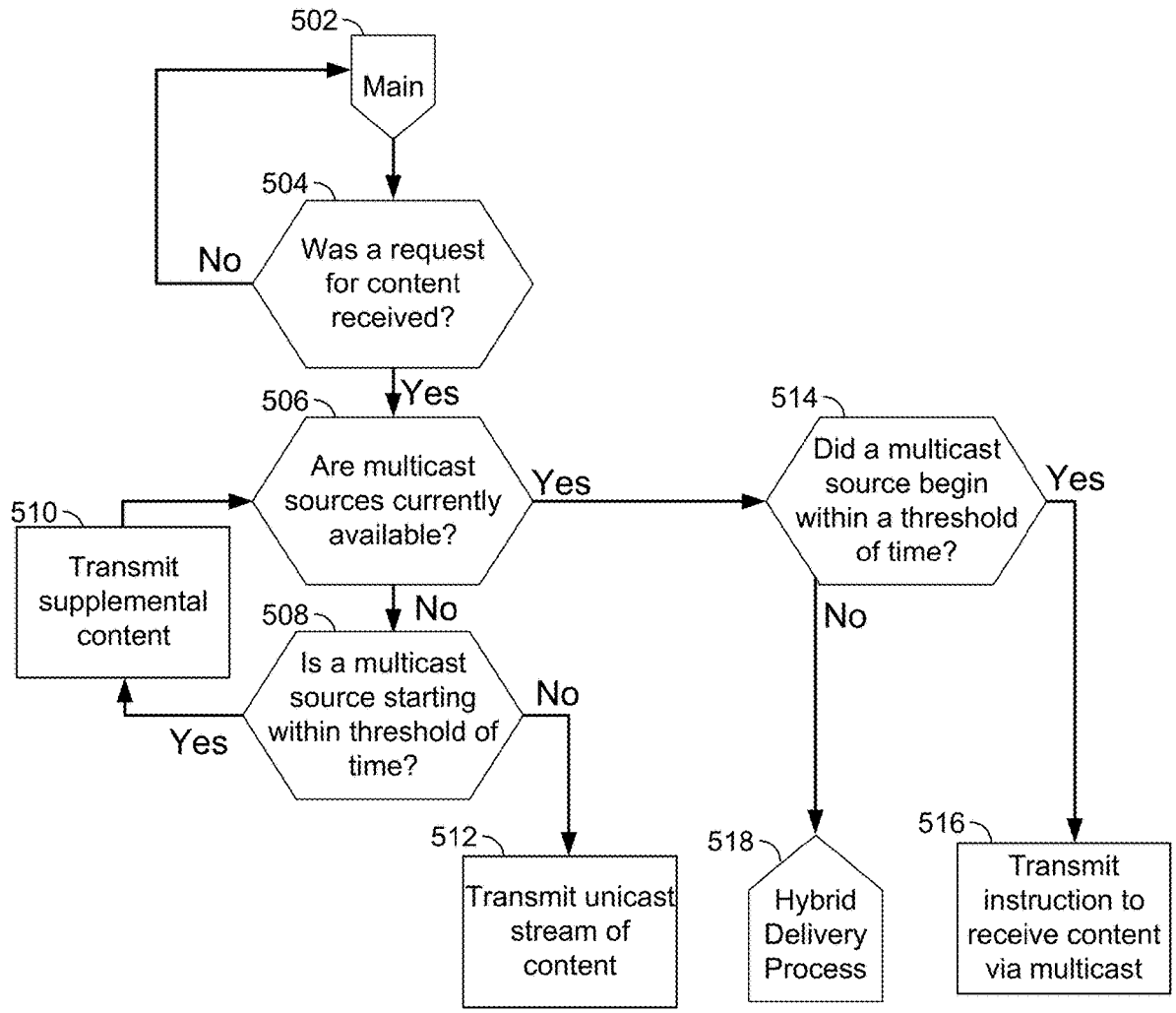
FIG. 5 is a flowchart of a detailed illustrative process for delivering content, in accordance with some embodiments of the disclosure.

FIG. 5 is a flowchart of a detailed illustrative process for delivering content, in accordance with some embodiments of the disclosure. It should be noted that each step of process 500 can be performed by control circuitry 304 (e.g., in a manner instructed to control circuitry 304 by the content delivery application) or any of the system components shown in FIG. 3.

A main loop of a process for delivering content begins at step 502. At step 504, a content delivery application determines (e.g., using control circuitry 304) whether a request for content was received. For example, the content delivery application may communicate (e.g., across a communication network such as 205 using I/O path 302) with user equipment 201 and receive a content request 232. If the content delivery application has not received a content request, the logic flow may loop back to 502. In some embodiments, the content request is an interrupt driven state that responds to receiving a content request 232 or other messaging. If the content delivery application receives a content request, then process 500 continues at step 506.

At 506, the content delivery application determines (e.g., using control circuitry 304) whether there are multicast sources available for the requested content. For example, the content delivery application may access a media guidance data source (e.g., content server 202 or multicast servers 203) to retrieve listings of available sources for the requested content. The sources may be provided, by way of example, in a JSON response that provides metadata associated with the requested content and sources. In some embodiments, the content delivery application may access a local data source (e.g., a database) using, for example, a data query. For example, the content delivery application may access a data table that contains content identifiers, source identifiers, start dates/times, description, title, rating, and/or other fields related to content. If no multicast sources are available for the requested content, then process 500 continues at step 508.

At 508, the content delivery application determines (e.g., using control circuitry 304) whether a multicast source for the content is starting within a threshold amount of time. For example, the content delivery application may be configured with a start time threshold. The content delivery application may use this threshold to determine whether to supplement an upcoming multicast version of the content with supplemental content or whether to start a unicast stream of the requested content. For example, if the next multicast version of the requested content starts in 30 minutes, this time may exceed a start time threshold of, e.g., 3 minutes. If a multicast source is starting within that threshold amount of time, then process 500 may continue at step 510 where the content delivery application transmits (e.g., using IO path 302) supplemental content to the user equipment. For example, the content delivery application may access a user's preferences for supplemental content to determine content relevant to the user. The content delivery application may further analyze the requested content to find an intersection between the requested content and the user's profile and select supplemental content relevant to the user and the content. For example, if the requested content is an animated feature, e.g., "Incredibles 2," the content delivery application may determine that the user has preferences for animated features and may further determine that an advertisement for another animated feature, e.g., "Moana," is relevant to the user's profile and the requested content. The content delivery application may then transmit the selected supplemental content to the user equipment while awaiting the start of the next multicast version of the requested content.

If a multicast source is not starting within the start time threshold amount of time, then process 500 may continue at step 512 where the content delivery application transmits (e.g., via IO path 302) a unicast stream of the requested content.

If multicast sources are available at step 506, then process 500 continues at step 514. At 514, the content delivery application determines (e.g., using control circuitry 304) whether a multicast source began within a threshold period of time. If the content delivery application determines that one of the multicast sources did begin within that threshold period of time, then the content delivery application continues at step 516 by transmitting (e.g., using IO path 302) an instruction to the user equipment to receive the requested content via the multicast source that began within the threshold period.

Figure 6:
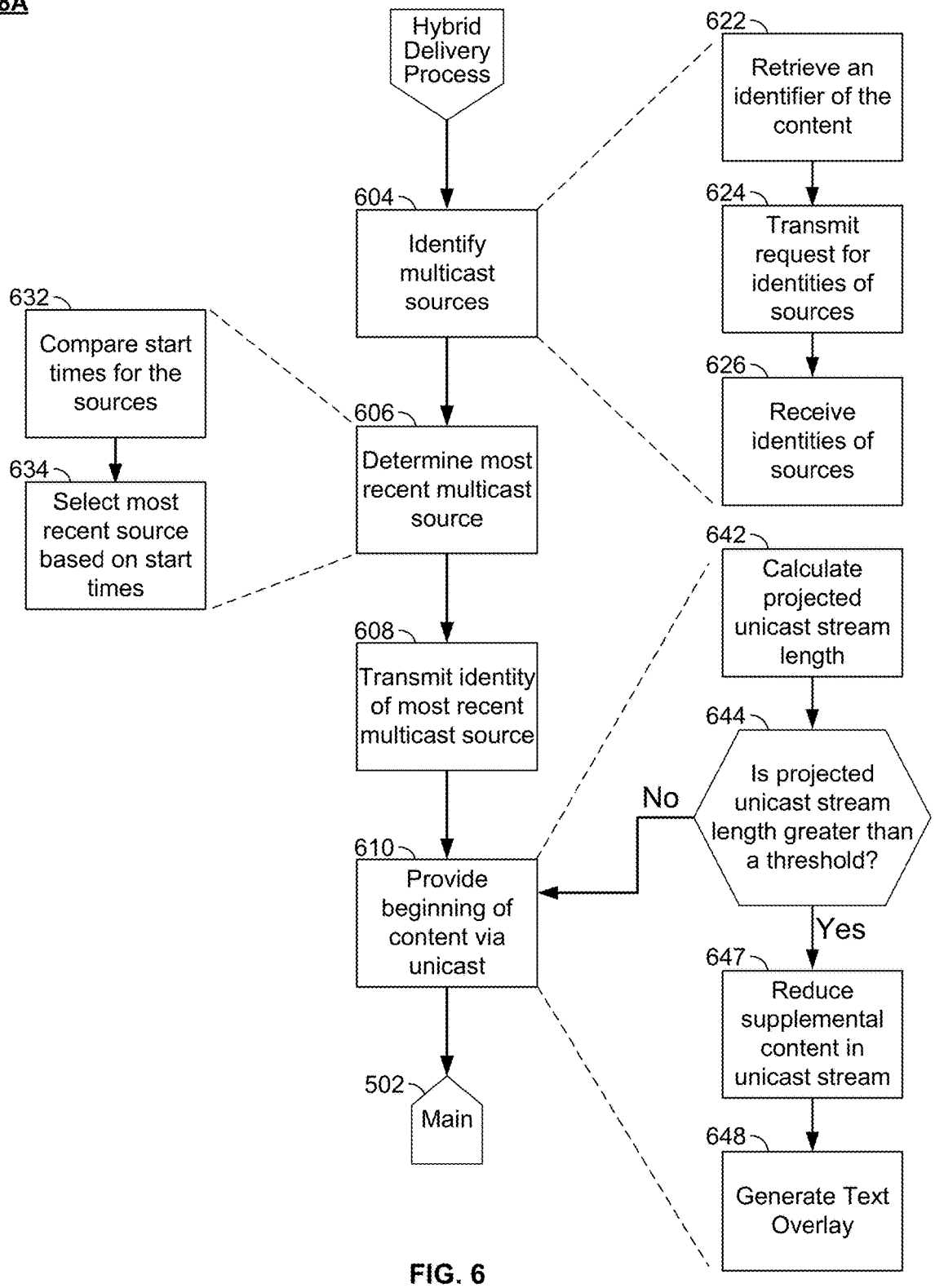
FIG. 6 is a flowchart of a detailed illustrative process for hybrid delivery of content via unicast and multicast, in accordance with some embodiments of the disclosure.

If the content delivery application determines that no multicast source began within that threshold of time, then the content delivery application continues at step 518 and invokes the hybrid delivery process described more fully in FIG. 6.

It should be noted that this embodiment can be combined with any other embodiment in this description and that process 500 is not limited to the devices or control components used to illustrate process 500 in this embodiment.

FIG. 6 is a flowchart of a detailed illustrative process for hybrid delivery of content via unicast and multicast, in accordance with some embodiments of the disclosure. It should be noted that each step of process 518A can be performed by control circuitry 304 (e.g., in a manner instructed to control circuitry 304 by the content delivery application) or any of the system components shown in FIG. 3.

Process 518A begins at step 604, where the content delivery application identifies (e.g., using control circuitry 304) a multicast source. For example, the process 518A may utilize a content identifier of requested content and attempt to locate a number of sources for that content. The content delivery application may determine that several multicast sources exist that provide access to the content. In some embodiments, the identification of the multicast sources occurs at step 506 of FIG. 5. Notably, the content delivery application may utilize this identification of sources for the purpose of step 604. In some embodiments, the content delivery application invokes steps 622, 624, and 626 to identify the multicast sources.

At step 622, the content delivery application retrieves (e.g., using control circuitry 304) an identifier of the content. At step 624, the content delivery application transmits (e.g., using IO path 312) a request to a media guidance data source (e.g., content server 202 or multicast servers 203) for identities of the multicast sources. The content delivery application generates the request to include the identifier of the content. At step 626, the content delivery application receives (e.g., using IO path 312) a response from the media guidance data source. The response may include identities of the multicast sources and start times for the multicast sources.

Process 518A continues from step 604 at step 606, where the content delivery application determines (e.g., using control circuitry 304) a recent multicast source from the multicast sources. For example, the content delivery application may determine which multicast source most recently began delivering the content relative to the other sources. In some embodiments, the content delivery application determines this multicast stream by continuing at step 632 where the content delivery application compares (e.g., using control circuitry 304) the start times for the multicast sources with one another. At step 634, the content delivery application identifies (e.g., using control circuitry 304), based on comparing the start times for the multicast sources with one another, one of the multicast sources. For example, the content delivery application identifies one of the multicast sources that has the latest (i.e., most recent) start time among the multicast sources that have already begun.

At step 608, the content delivery application continues process 518A by transmitting (e.g., using IO path 312), to the user equipment, an identity of the recent multicast source. For example, the content delivery application may generate a JSON response that includes an identifier of the requested content, an identifier of the recent multicast source (or several identifiers for several sources), a start time of the multicast source (or several corresponding start times), and/or other information relevant for accessing a multicast version of the requested content.

At step 610, the content delivery application provides a beginning portion of the content to the user equipment via a unicast stream. In some embodiments, the content delivery application provides a reduced amount of content in the beginning portion of the content to allow the unicast stream to catch up to the multicast source more quickly than if the entire content of the unicast stream were used.

For example, the content delivery application may continue at step 642, where the content delivery application calculates (e.g., using control circuitry 304) a projected unicast stream length. The content delivery application may retrieve a timestamp indicating a position of the recent multicast source in the content corresponding with when the user equipment began buffering the recent multicast source. Using the example from FIG. 2, the user equipment 201 began buffering the multicast content 220 from source 2 at the 15-minute mark of the requested content. The content delivery application may, using this example, calculate the difference in time between the timestamp and a start time of the unicast stream in the content. For example, the unicast stream may begin at the 0-minute mark, making the difference, and projected unicast stream length, 15 minutes.

At step 644, the content delivery application may continue process 518A by determining (e.g., using control circuitry 304) whether the projected unicast stream length exceeds a threshold. If the projected unicast stream length does not exceed the threshold, then the content delivery application performs no reduction of the unicast stream. If the projected unicast stream length does exceed the threshold, then the content delivery application may reduce content in the unicast stream at step 646. For example, the content delivery application may detect (e.g., using control circuitry 304) an advertisement period in the unicast stream and reduce the advertisement period in the unicast stream based on the projected unicast stream length. In one example, if the advertising period makes up a certain percentage (e.g., 30% or more) of the projected unicast stream length, the content delivery system may determine that the benefits of reducing the unicast stream (to more quickly realize the benefits of multicast stream) outweigh the benefits of serving advertisements. Thus, the content delivery application may cut a portion of the advertising to reduce the advertising period.

In some embodiments, the content delivery application may augment content in the unicast stream when removing supplemental content at step 648 of process 518A. For example, the content delivery application may (e.g., using control circuitry 304) retrieve textual information (e.g., a summary) of an advertisement that is being removed from the unicast stream. The content delivery application may then overlay the textual information on the video frames of the content in the unicast stream after removing the advertisement so that the information is presented to the user equipment without requiring the time necessary to run the advertisement in the unicast stream. This removal of the advertising period reduces the network utilization required by the unicast stream.

In some embodiments, the content delivery application inserts supplemental content into the unicast stream when providing that stream to the user equipment. For example, the content delivery application may identify a user profile associated with the user equipment and retrieve advertising content targeted to the user profile. The content delivery application may further determine an advertising period in the content and insert the corresponding advertisement into the unicast stream. For example, the content delivery application may determine the user profile is associated with information that suggests the user may be susceptible to shoe advertisements (e.g., a user profile for a user logged in to a user equipment includes purchases of shoes or past searches for shoes). The content delivery application may then retrieve a shoe advertisement from an advertisement pool and provide that advertisement to the user equipment or direct the user equipment to access the advertisement. In some embodiments, the content delivery application may optimize the advertisements to limit the duration of those advertisements or reduce the amount of time the unicast stream is used to deliver content to the user equipment.

In some embodiments, the content delivery application may detect a second request for the content of the unicast stream (e.g., 230) that has been made close in time to the content request (e.g., 232). In response to the second request, the content recommendation application may determine that the unicast stream (e.g., 230) may be converted to a multicast content to provide the catch-up content to the original content requester (e.g., user equipment 201) and the new requester. The content recommendation application may direct a message to the original content requester (e.g., user equipment 201) to switch from receiving the unicast stream (e.g., unicast stream 230) to new multicast content that provides the content from the current point of the unicast stream (e.g., 230) to the point of the multicast content being buffered by the first requester (e.g., multicast content 220). The first content requester (e.g., user equipment 201) may continue accessing the content from the new multicast content while buffering the original multicast content (e.g., 220). While the new requester would begin buffering the multicast content from 220 and buffering the new multicast content while, at the same time, request a unicast stream of the content starting at time point 0. For example, a first user request content 15 minutes after the content starts at time point X. The content recommendation application sends a unicast stream to the user to serve the content from 0 to 15 minutes while the user's equipment buffers the content from the current multicast source. At time point X+5, a second user requests the same content (now 20 minutes in to the content). Rather than start a second unicast stream, the content recommendation application starts a multicast source for the content from the 5-minute mark going up to the 20-minute mark. The first user's equipment continues buffering the original multicast source and the second user's equipment begins buffering the original multicast source (now at 20 minutes). The second user's equipment also begins buffering a new multicast content that is the content from 5 minutes to 20 minutes. The content recommendation application starts a unicast source for the second user equipment to begin at time 0 and go up to 5 minutes. As other users request the same content, the process can continue a similar process to merge as many users into a multicast streams as possible and reduce the amount of time spent in a unicast stream for each user. As discussed herein, the unicast stream for each user may be shortened to minimize the length of time spent in the unicast stream and allow the users to catchup to an ongoing multicast stream. Further, the content recommendation application may determine the amount of time needed for a unicast stream to catch up to one of the existing multicast streams. If that time is below a threshold (e.g., 5% or 5 minutes or some other suitable threshold), the content recommendation application may determine that rather than starting a new multicast stream and directing users to begin multiple buffers, the content recommendation application should send the new requester an accelerated or shortened unicast stream to catch the user up to the requested content. These techniques may be applied to any number of streams and users as appropriate. In some embodiments, the content recommendation application may consider the resources needed to service multiple users before adjusting the output to new content streams.

It should be noted that this embodiment can be combined with any other embodiment in this description and that process 518A is not limited to the devices or control components used to illustrate process 518A in this embodiment.

Figure 7:
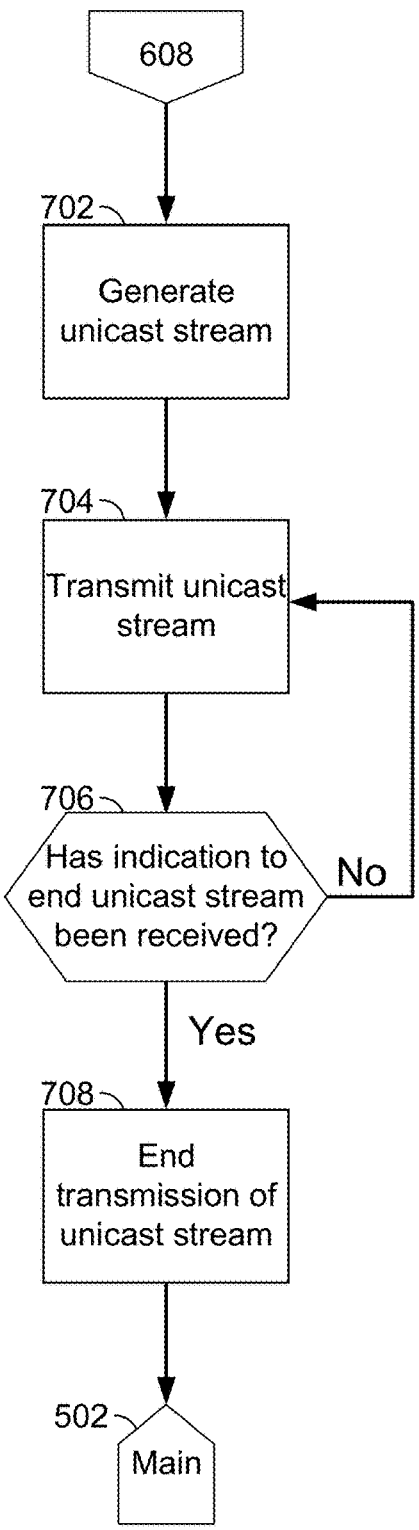
FIG. 7 is a flowchart of a detailed illustrative process for delivering the beginning of content via unicast, in accordance with some embodiments of the disclosure.

FIG. 7 is a flowchart of a detailed illustrative process for delivering the beginning of the requested content via unicast, in accordance with some embodiments of the disclosure. It should be noted that each step of process 610A can be performed by control circuitry 304 (e.g., in a manner instructed to control circuitry 304 by the content delivery application) or any of the system components shown in FIG. 3.

Process 610A begins after step 608 of FIG. 6 at step 702. At 702, the content delivery application generates (e.g., using control circuitry 304) a unicast stream of the content. For example, the content delivery application retrieves a start point of the content from a content request 232. The content delivery application accesses (e.g., via IO path 302) storage containing the requested content (e.g., storage 308 or, in the case of a client-server application, content server 202) and accesses the content at the start point. In some embodiments, the content delivery application transcodes the content for appropriate delivery. In some embodiments, the content delivery application identifies the start point in the content and begins transmission of the unicast stream (e.g., unicast stream 230) to the user equipment (e.g., user equipment 201) at step 704.

At step 706, the content delivery application determines (e.g., using control circuitry 304) whether it has received an indication that the unicast stream should end. For example, the content delivery application may receive a message from the user equipment that instructs the content delivery application to end the transmission. This message indicates, for example, that the unicast stream has reached a timepoint in the content that corresponds with content in a buffered multicast source. In other words, the message indicates that the user equipment is switching from the unicast source to a multicast source. While awaiting this message, the content delivery application continues transmission of the unicast stream to the user equipment. If the content delivery application receives an indication to end the unicast stream, the content delivery application continues process 610A at step 708 and ends the unicast stream.

It should be noted that this embodiment can be combined with any other embodiment in this description and that process 610A is not limited to the devices or control components used to illustrate process 610A in this embodiment.

Figure 8:
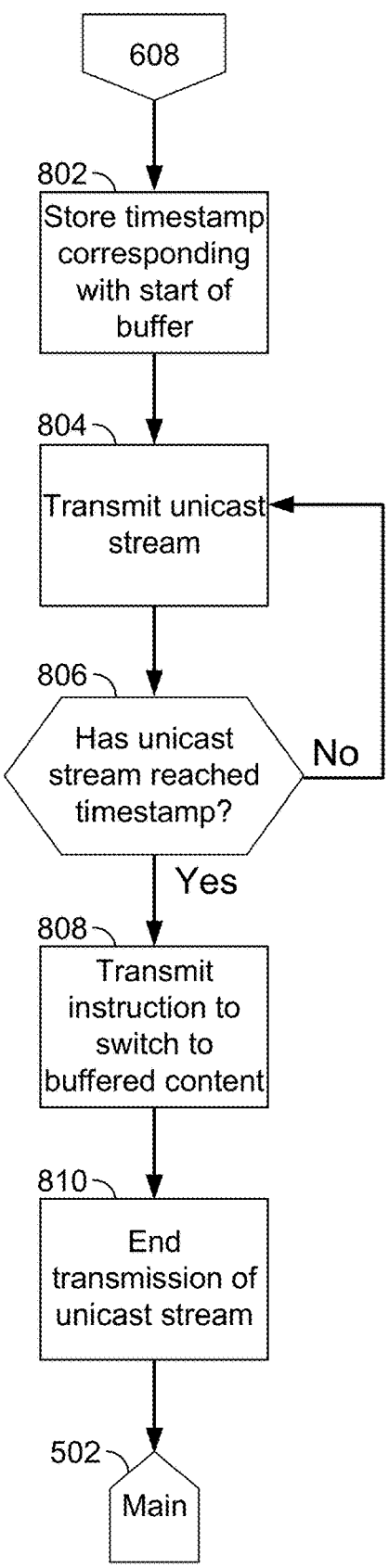
FIG. 8 is a flowchart of a second detailed illustrative process for delivering the beginning of content via unicast, in accordance with some embodiments of the disclosure.

FIG. 8 is a flowchart of a second detailed illustrative process for delivering the beginning of content via unicast, in accordance with some embodiments of the disclosure. It should be noted that each step of process 610B can be performed by control circuitry 304 (e.g., in a manner instructed to control circuitry 304 by the content delivery application) or any of the system components shown in FIG. 3.

Process 610B begins after step 608 of FIG. 6 at step 802. At step 802, the content delivery application stores (e.g., using control circuitry 304) a timestamp indicating a current position the content in the multicast source used to buffer the content in the user equipment. For example, using FIG. 2 as illustrative, the user equipment began buffering multicast content 220 from source 2 at the 15-minute mark of the requested content. Thus, the content delivery application stores (e.g., in storage 308) a data entry indicating that the buffer started at the 15-minute mark. At step 804, the content delivery application transmits, to the user equipment, the unicast stream as discussed above. During transmission of the unicast stream, the content delivery application keeps track of the current point in the content being streamed relative to the time point. For example, if the unicast stream starts at the 0-minute mark, then the current position in the content of the unicast stream starts at 00:00 and progresses with the delivery of the unicast stream.

At 806, the content delivery application determines (e.g., using control circuitry 304) whether the unicast stream has reached a timepoint in the content corresponding with the timestamp indicating when the buffered started. Using the prior example, when the current time reaches the timepoint corresponding with the start of the buffer, the content delivery application determines that the buffer point has been reached.

In some embodiments, the content delivery application continues to step 808 in response to determining the unicast stream has reached a timepoint in the content corresponding with the timestamp indicating when the buffered started. At step 808, the content delivery application transmits (e.g., using IO path 302), in response to determining the unicast stream has reached the timepoint in the content corresponding with the timestamp, an instruction to the user equipment (e.g., 201) to switch from the unicast stream to the buffered multicast source. For example, the content delivery application may generate a WEB RTC message that provides information to the user equipment including a notification that the content delivery application is terminating the unicast stream.

At step 810, the content delivery application terminates transmission of the unicast stream to the user equipment. For example, the content delivery application generates a message containing a tag, e.g., an EXT-X-ENDLIST tag, that indicates the unicast stream is terminated and transmits the message to the user equipment.

It should be noted that this embodiment can be combined with any other embodiment in this description and that process 610B is not limited to the devices or control components used to illustrate process 610B in this embodiment.

Figure 9:
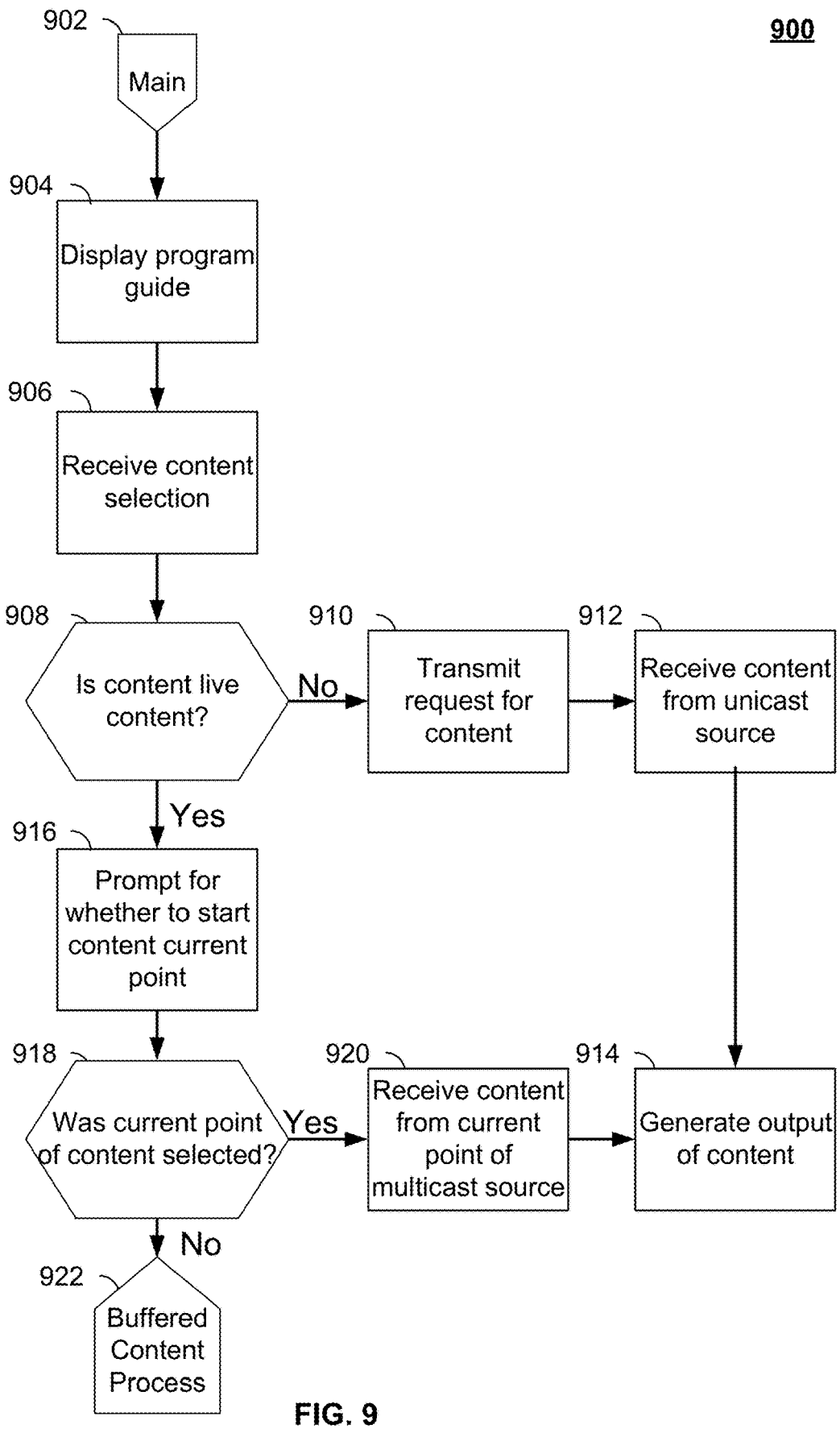
FIG. 9 is a flowchart of a detailed illustrative process for accessing content, in accordance with some embodiments of the disclosure.

FIG. 9 is a flowchart of a detailed illustrative process for accessing content, in accordance with some embodiments of the disclosure. It should be noted that each step of process 900 can be performed by control circuitry 304 (e.g., in a manner instructed to control circuitry 304 by the content delivery application) or any of the system components shown in FIG. 3.

A main loop of a process for accessing content begins at step 902. At step 904, a content access application displays (e.g., using control circuitry 304 in communication with a user interface input 310) a program guide. For example, an interactive program guide (e.g., display 400) listing available content may be displayed on user equipment 201.

At step 906, the content access application (e.g., via user interface input 310) receives a content selection (e.g., a selection encompassed by highlight region 452). For example, a user equipment 201 may receive a selection of a movie for display (e.g., "Incredibles 2") using an interactive program guide.

At step 908, the content access application determines (e.g., using control circuitry 304) whether the selected content is live content. For example, the content access application retrieves metadata associated with an entry for the content from an interactive guide and determines whether the content is currently being delivered by a multicast source, and, in some embodiments, the content access application further determines when the content started on the multicast sources.

If the content access application determines, at step 908, that the content is not live, then the content access application may continue process 900 at step 910. At step 910, the content access application transmits (e.g., via IO path 302) a request for the selected content to, for example, a content server 202. At step 912, the content access application receives (e.g., via IO path 302) the content via a unicast source. Process 900 continues at step 914 where the content access application generates, for output, (e.g., using user input interface 310) the selected content as received from the unicast stream.

If the content access application determines, at step 908, that a live version of the content is available, i.e., that a multicast source is delivering the requested content, then the content access application may continue process 900 at step 916. At step 916, the content access application prompts (e.g., displays prompt 460 of FIG. 4A using user input interface 310) a user with a selection of whether to start the content at the current point of a multicast source or whether to start at another point, e.g., an earlier point, such as the start of the content. At step 918, the content access application determines (e.g., using control circuitry 304) whether it received a selection to start at the current point in the content.

If the content access application determines, at step 918, that it received a selection to start the content at the current point, then process 900 continues at step 920. At step 920, the content access application receives (e.g., using control circuitry 304) the selected content from a multicast source starting at the current point. For example, the content access application activates a tuner and tunes to a channel of an OTA broadcast that includes the selected content. Additionally, or alternatively, the content access application may join a multicast stream of the selected content using, for example, IGMP protocols. Process 900 continues at step 914 where the content access application generates, for output, (e.g., using user input interface 310) the selected content as received from the unicast stream (e.g., a display like display 480 of FIG. 4B).

If the content access application determines, at step 918, that it received a selection to start the content an earlier point in the content, e.g., the beginning, then process 900 continues at step 922 and the content access application activates the buffered content process described below with reference to FIG. 10.

It should be noted that this embodiment can be combined with any other embodiment in this description and that process 900 is not limited to the devices or control components used to illustrate process 900 in this embodiment.

Figure 10:
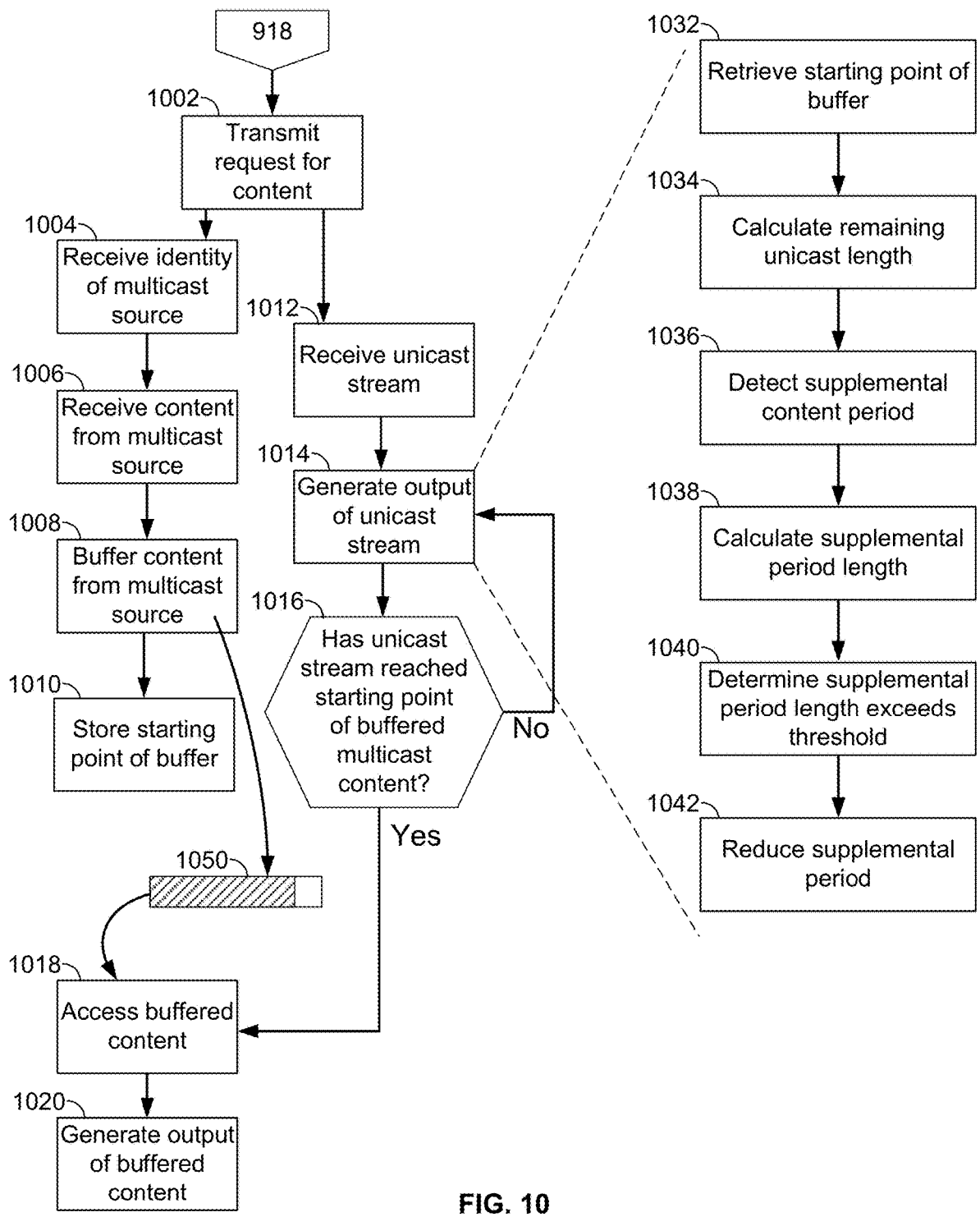
FIG. 10 is a flowchart of a detailed illustrative process for accessing content via unicast and multicast, in accordance with some embodiments of the disclosure.

FIG. 10 is a flowchart of a detailed illustrative process for accessing content via unicast and multicast, in accordance with some embodiments of the disclosure. It should be noted that each step of process 922A can be performed by control circuitry 304 (e.g., in a manner instructed to control circuitry 304 by the content delivery application) or any of the system components shown in FIG. 3.

Process 922A begins after step 918 of FIG. 9 at step 1002. At step 1002, the content access application transmits (e.g., via 10 path 302) a request for content to a content source such as content server 202. The content access application begins a parallel process of buffering a multicast source of the requested content while accessing a unicast stream for earlier portions of the requested content (i.e., a portion of the requested content from before the current point of the multicast source). This is depicted in FIG. 10 with a dual logic path leaving step 1002.

At step 1004, the content access application receives (e.g., using IO path 312) an identity of a multicast source. The multicast source is identified from multicast sources that are providing access to the requested content. In some embodiments, a multicast source is identified as the source that most recently began streaming the requested content relative to other streams from other multicast sources.

At step 1006, the content access application receives (e.g., using IO path 312) portions of the requested content via a multicast source. Using FIG. 2 as an example, if the content access application is provided with the identity of multicast source 2, then the content access application begins receiving the requested content as multicast content 220 from source 2 at the timepoint in the content corresponding with the current time of the multicast source, e.g., at the 15-minute mark. At step 1008, the content access application buffers the content from the multicast source. For example, the content access application may store the content from the multicast source in storage 308 for later access. In FIG. 10, the buffered multicast content buffer 1050 is depicted as being filled by step 1008.

At step 1010, the content access application may store (e.g., using control circuitry 304 and storage 308) a timepoint corresponding with the point in the requested content when the content access application began buffering the multicast content. Using FIG. 2 as an example, the content access application stores a timepoint corresponding with the 15-minute mark, which is the point in the content when the content access application began buffering content from multicast source 2.

In parallel with buffering the multicast content, process 922A continues from step 1002 at step 1012. At step 1012, the content access application receives (e.g., using IO path 302) a unicast stream that includes a portion of the content that precedes the multicast content. For example, the unicast stream may provide access to the content from 00:00 to 15:00 in the content. At step 1014, the content access application generates, for output, (e.g., using user input interface 310), the selected content as received from the unicast stream (e.g., display 480 of FIG. 4B).

In some embodiments, process 922A reduces the amount of time consumed accessing the unicast stream according to steps 1032-1042. At step 1032, the content access application (e.g., using control circuitry 304) retrieves a starting position of the multicast source corresponding with the point in the content when the buffering of the multicast source began. For example, the content access application retrieves a timepoint corresponding with the 15-minute mark from, e.g., storage 308. At step 1034, the content access application (e.g., using control circuitry 304) calculates a remaining unicast stream length. The content access application calculates the projected remaining unicast stream length based on the difference in time between the starting position of the multicast source, e.g., where the buffering of the multicast source began, and the current position of the unicast stream in the content. At step 1036, the content access application (e.g., using control circuitry 304) detects a period for supplemental content in the unicast stream. For example, the content access application may access metadata corresponding with the unicast stream that identifies advertising periods in the unicast stream. At step 1038, the content access application (e.g., using control circuitry 304) calculates a supplemental content length corresponding to the supplemental content. For example, the content access application may determine the unicast stream includes 3 minutes of advertisements.

In some embodiments, the content access application retrieves a threshold for a limit of the amount of supplemental content in the unicast stream. For example, the content access application may access storage 308 to retrieve a configurable threshold, or the threshold may be programmed into the instructions of the content access application (i.e., hardcoded). At step 1040, the content access application (e.g., using control circuitry 304) determines the supplemental content length exceeds this threshold. For example, a content provider may determine that it is limiting the resources consumed by unicast streams and will reduce supplemental content in the unicast stream to preserve those resources. In the case of advertising, the content delivery system may determine that advertisements in the unicast stream should not exceed the threshold length. At step 1042, therefore, the content access application may reduce (e.g., using control circuitry 304) the supplemental period in the unicast stream. In some embodiments, the content access application removes frames of video and corresponding audio from the unicast stream. In some embodiments, the content access application skips a portion, or all, of the supplemental content (e.g., advertising) in the unicast stream.

At step 1016, the content access application determines (e.g., using control circuitry 304) whether the unicast stream has reached the starting point of the buffered multicast content 1050. For example, the content access application retrieves (e.g., using control circuitry 304) a starting position of the buffered multicast content 1050 (e.g., from storage 308) corresponding with a point in the content when the buffering of the multicast content began. The content access application determines a current position of the unicast stream in the content, i.e., the timepoint in the content of the current position of the unicast stream. For example, the content access application may access metadata corresponding with the unicast stream that provides the timepoint in the content of the unicast stream. The content access application determines (e.g., using control circuitry 304) whether the current position of the unicast stream in the content has reached the starting position of the multicast content. If the unicast stream has not reached the beginning of the buffered multicast content 1050, then process 922A continues outputting the unicast stream at step 1014.

If the unicast stream has reached the beginning of the buffered multicast content 1050, then the content access application continues process 922A at step 1018 by accessing (e.g., using control circuitry 304) the buffered multicast content 1050. Process 922A continues at step 1020, where the content access application generates, for output, the buffered multicast content 1050 using, e.g., user input interface 310.

It should be noted that this embodiment can be combined with any other embodiment in this description and that process 922A is not limited to the devices or control components used to illustrate process 922A in this embodiment.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A computer-implemented method comprising:
receiving, from user equipment, a request for content;
retrieving data indicating a position in a multicast source of the content corresponding with when the user equipment began buffering the multicast source;
calculating a projected unicast stream length based on a difference in a start time in the content of a unicast stream and the position in the content when the user equipment began buffering the multicast source;
detecting an advertisement period in the unicast stream;
reducing the advertisement period, wherein the advertisement period in the unicast stream is reduced based on the projected unicast stream length; and
providing a beginning portion of the content to the user equipment via the unicast stream.

2. The method of claim 1, further comprising:
identifying a plurality of multicast sources, wherein the content is accessible via each of the multicast sources;
determining, as the multicast source, a recent multicast source from the plurality of multicast sources, wherein the recent multicast source most recently began delivering the content relative to other multicast sources of the plurality of multicast sources; and
transmitting, to the user equipment, an identity of the recent multicast source.

3. The method of claim 1, wherein providing the beginning portion of the content to the user equipment via the unicast stream comprises:
transmitting, to the user equipment, the unicast stream;
receiving an indication to end the unicast stream; and
in response to receiving the indication to end the unicast stream, ending the transmission of the unicast stream.

4. The method of claim 1, wherein providing the beginning portion of the content to the user equipment via the unicast stream comprises:
storing a timestamp indicating the current position of the multicast source in the content corresponding with when the user equipment began buffering the multicast source;
transmitting, to the user equipment, the unicast stream;
determining the unicast stream has reached a timepoint in the content corresponding with the timestamp;
transmitting, in response to determining the unicast stream reached the timepoint in the content corresponding with the timestamp, an instruction to the user equipment to switch from the unicast stream to a buffer of the multicast source; and
ending the transmission of the unicast stream.

5. The method of claim 1, wherein:
identifying a plurality of multicast sources by:
retrieving an identifier of the content;
transmitting a request to a media guidance data source for identities of the plurality of multicast sources, wherein the request to the media guidance data source comprises the identifier of the content; and
receiving a response from the media guidance data source, the response comprising a plurality of identities of the plurality of multicast sources and respective start times for the plurality of multicast sources; and
determining the multicast source from the plurality of multicast sources by:
comparing the respective start times for the plurality of multicast sources with one another; and
identifying, based on comparing the respective start times for the plurality of multicast sources with one another, one of the plurality of multicast sources, wherein the identified one of the plurality of multicast sources has a latest start time among the plurality of multicast sources that have already begun.

6. The method of claim 1, further comprising:
retrieving textual information related to advertisement content associated with the advertisement period; and
supplementing the unicast stream with the textual information.

7. The method of claim 6, further comprising:
identifying a user profile associated with the user equipment; and
determining the advertisement content based on the user profile.

8. The method of claim 1, wherein:
the advertisement content is associated with a plurality of advertisements; and
reducing the advertisement period comprises removing at least one advertisement of the plurality of advertisements from the advertisement period.

9. The method of claim 1, wherein:
reducing the advertisement period comprises shortening a length of at least one advertisement associated with the advertisement period.

10. The method of claim 1, further comprising:
storing, in memory, a single copy of the content comprising:
the beginning portion of the content provided to the user equipment via the unicast stream; and
a remaining portion of the content provided via the multicast source.

11. A system comprising:
memory;
control circuitry configured to:
receive, from user equipment, a request for content;
retrieve data indicating a position in a multicast source of the content corresponding with when the user equipment began buffering the multicast source, wherein the content associated with the multicast source is stored in the memory;
calculate a projected unicast stream length based on a difference in a start time in the content of a unicast stream and the position in the content when the user equipment began buffering the multicast source;
detect an advertisement period in the unicast stream;
reduce the advertisement period, wherein the advertisement period in the unicast stream is reduced based on the projected unicast stream length; and
provide a beginning portion of the content to the user equipment via the unicast stream.

12. The system of claim 11, wherein the control circuitry is further configured to:
identify a plurality of multicast sources, wherein the content is accessible via each of the multicast sources;
determine, as the multicast source, a recent multicast source from the plurality of multicast sources, wherein the recent multicast source most recently began delivering the content relative to other multicast sources of the plurality of multicast sources; and transmit, to the user equipment, an identity of the recent multicast source.

13. The system of claim 11, wherein the control circuitry is further configured to provide the beginning portion of the content to the user equipment via the unicast stream by:
   transmitting, to the user equipment, the unicast stream;
   receiving an indication to end the unicast stream; and
   in response to receiving the indication to end the unicast stream, ending the transmission of the unicast stream.

14. The system of claim 11, wherein the control circuitry is further configured to provide the beginning portion of the content to the user equipment via the unicast stream by:
   storing a timestamp indicating the current position of the multicast source in the content corresponding with when the user equipment began buffering the multicast source;
   transmitting, to the user equipment, the unicast stream;
   determining the unicast stream has reached a timepoint in the content corresponding with the timestamp;
   transmitting, in response to determining the unicast stream reached the timepoint in the content corresponding with the timestamp, an instruction to the user equipment to switch from the unicast stream to a buffer of the multicast source; and
   ending the transmission of the unicast stream.

15. The system of claim 11, wherein:
   the control circuitry is configured to identify a plurality of multicast sources by:
      retrieving an identifier of the content;
      transmitting a request to a media guidance data source for identities of the plurality of multicast sources, wherein the request to the media guidance data source comprises the identifier of the content; and
      receiving a response from the media guidance data source, the response comprising a plurality of identities of the plurality of multicast sources and respective start times for the plurality of multicast sources; and
   the control circuitry is configured to determine the multicast source from the plurality of multicast sources by:
      comparing the respective start times for the plurality of multicast sources with one another; and
      identifying, based on comparing the respective start times for the plurality of multicast sources with one another, one of the plurality of multicast sources, wherein the identified one of the plurality of multicast sources has a latest start time among the plurality of multicast sources that have already begun.

16. The system of claim 11, wherein the control circuitry is further configured to:
   retrieve textual information related to advertisement content associated with the advertisement period; and
   supplement the unicast stream with the textual information.

17. The system of claim 16, wherein the control circuitry is further configured to:
   identify a user profile associated with the user equipment; and
   determine the advertisement content based on the user profile.

18. The system of claim 11, wherein:
   the advertisement content is associated with a plurality of advertisements; and
   the control circuitry is configured to reduce the advertisement period by removing at least one advertisement of the plurality of advertisements from the advertisement period.

19. The system of claim 11, wherein:
   the control circuitry is configured to reduce the advertisement period by shortening a length of at least one advertisement associated with the advertisement period.

20. The system of claim 11, wherein the control circuitry is further configured to:
   store, in the memory, a single copy of the content comprising:
      the beginning portion of the content provided to the user equipment via the unicast stream; and
      a remaining portion of the content provided via the multicast source.

\* \* \* \* \*